(12) United States Patent
Andrei

(10) Patent No.: US 6,260,430 B1
(45) Date of Patent: Jul. 17, 2001

(54) FACE GEAR TRANSMISSION, IN PARTICULAR FOR AIRCRAFT APPLICATION

(75) Inventor: Gianluca Andrei, Turin (IT)

(73) Assignee: Fiatavio S.p.A., Torino (IT)

( * ) Notice: Subject to any disclaimer, the term of this patent is extended or adjusted under 35 U.S.C. 154(b) by 0 days.

(21) Appl. No.: 09/419,277

(22) Filed: Oct. 15, 1999

(30) Foreign Application Priority Data

Oct. 16, 1998 (IT) .............................................. TO98A0881

(51) Int. Cl.⁷ ................. F16H 1/22; F16H 55/22
(52) U.S. Cl. ................. 74/410; 74/416; 74/420; 74/665 C
(58) Field of Search ............................... 74/410, 416, 420, 74/665 C

(56) References Cited

U.S. PATENT DOCUMENTS 5,802,918 * 9/1998 Chen et al. ............................. 74/416
5,807,202 * 9/1998 Sammataro ....................... 74/416 X

FOREIGN PATENT DOCUMENTS

WO 98/16762    4/1998 (WO).

* cited by examiner

Primary Examiner—Allan D. Herrmann
(74) Attorney, Agent, or Firm—Kinney & Lange, P.A.

(57) ABSTRACT

A face gear transmission, in particular for aircraft application, has a floating input pinion rotating about a respective axis, and two face gears which are positioned facing each other, rotate about a common axis forming an angle of other than 90° with the axis of the pinion, both mesh with the input pinion, and have respective different diameters.

8 Claims, 1 Drawing Sheet

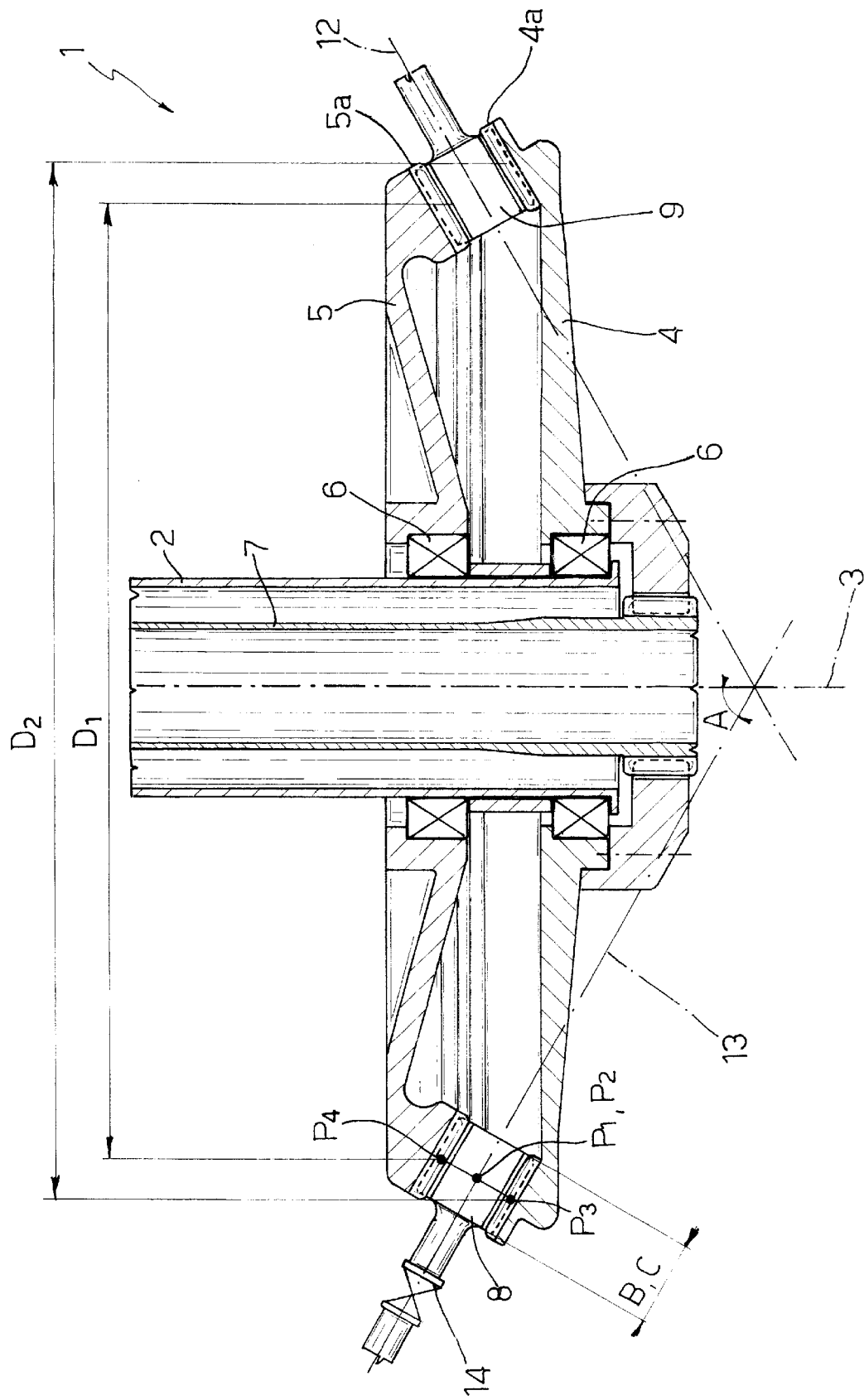

FACE GEAR TRANSMISSION, IN PARTICULAR FOR AIRCRAFT APPLICATION

The present invention relates to a face gear transmission, in particular for aircraft application.

BACKGROUND OF THE INVENTION

In aircraft applications, motion is known to be transmitted from an input shaft to an output shaft using a face gear transmission, which comprises two coaxial, counter-rotating face gears positioned facing each other, and at least one floating pinion meshing with both face gears.

In most applications, the face gears are the same size, and the pinion rotates about a respective axis perpendicular to the axes of rotation of the face gears.

Inclined-axis solutions are also known, in which the face gears are again the same size, but the angle between the axis of rotation of the pinion and those of the face gears is other than 90°.

Whereas perpendicular-axis solutions pose substantially no problems, inclined-axis solutions, though used, are functionally inefficient and unreliable.

In actual use, in fact, the face gears transmit to the pinion respective actions which, since both face gears are the same size, generate on the pinion a tilting torque acting in the pinion axis plane and which moves the pinion unpredictably with respect to the face gears, thus resulting in an equally unpredictable variation in theoretical torque flow to the two face gears and, consequently, in a variation in stress on the teeth. In particular, a tilting torque on the pinion causes an unpredictable and uncontrollable variation in the specific pressure pattern along the teeth of both the face gears and the pinion, with the generation of localized pressure peaks. Since both the face gears and the pinion must obviously be sized on the basis of maximum possible stress values, the teeth of both the face gears and the pinion are considerably larger than they would be in the absence of said tilting torque, i.e. in a perpendicular-axis arrangement, thus resulting in a considerable increase in weight, size and, hence, cost.

SUMMARY OF THE INVENTION

It is an object of the present invention to provide a face gear transmission, in particular for aircraft application, designed to eliminate the aforementioned drawbacks.

According to the present invention, there is provided a face gear transmission, in particular for aircraft application, comprising at least one floating pinion rotating about a first axis; and two face gears rotating about a common second axis, positioned facing each other, and both meshing with said floating pinion; said first and second axis forming an angle of other than 90°; characterized in that said two face gears have different diameters; and in that the resultants of the forces exchanged between the face gears and the floating pinion are applied at respective points, the projections of which on said first axis are substantially coincident with each other.

BRIEF DESCRIPTION OF THE DRAWINGS

The invention will be described with reference to the accompanying drawing, which shows a schematic section of a preferred non-limiting embodiment of the face gear transmission according to the present invention.

DETAILED DESCRIPTION OF THE INVENTION

Number 1 in the accompanying drawing indicates a face gear transmission, in particular for aircraft application, interposable between one or more engines (not shown) and one or more user devices (not shown), and comprising a fixed tubular supporting structure 2 having a respective axis 3, and a pair of face gears 4 and 5, both of which are connected to structure 2 in axially-fixed manner and for rotation about axis 3 by means of respective known bearings 6 shown schematically. Gear 4 is fitted to a main output shaft 7 extending inside structure 2 and coaxially with axis 3; and gears 4 and 5 comprise respective face teeth 4a and 5a, which are positioned facing each other and, in the example described, both mesh with an input pinion 8 and with a number of known transmission pinions 9, only one of which is shown in the accompanying drawing. Pinions 9 rotate about respective axes 12 intersecting and forming respective angles other than 90° with axis 3, while pinion 8 is a floating cylindrical pinion having a respective axis 13 intersecting and forming an angle A of other than 90° with axis 3, and is connected to supporting structure 2 by a known flexible connecting device 14 enabling pinion 8 to rotate about axis 13 and to move crosswise with respect to axis 13 in a plane containing axes 3 and 13 and coincident with the plane of the accompanying drawing.

With reference to the accompanying drawing, teeth 4a and 5a have respective widths B, measured parallel to axis 13, equal to each other and to the width C of the teeth of pinion 8 measured in the same direction, and respective different mean diameters D1 and D2. More specifically, mean diameters D1 and D2 are so selected that the projections P1 and P2 on axis 13 of the points P3 and P4 at which the resultants of the forces exchanged between pinion 8 and gears 4 and 5 are applied are coincident with each other, as shown in the accompanying drawing, or at most are located such a distance apart that, in the specific operating conditions of transmission 1, the inevitable tilting torque resulting from noncoincidence of the two projections P1 and P2 does not impair the normal movement of floating pinion 8 crosswise to axis 13.

The particular design characteristics of transmission 1 described, and in particular the use of two face gears 4 and 5 with different mean diameters D1 and D2, therefore enable pinion 8—even in the event of axis of rotation 13 forming an angle A of other than 90° with the axis of rotation 3 of face gears 4 and 5—to move crosswise with respect to axis 13 and so distribute the input torque equally between the two face gears 4 and 5. In other words, sizing the two gears 4 and 5 differently so as to eliminate or render practically ineffective the tilting torque transmitted to pinion 8 by face gears 4 and 5 provides for achieving on pinion 8 a distribution of forces similar to if not identical with that which would be achieved if axes 13 and 3 of pinion 8 and face gears 4 and 5 were to form a 90° angle.

Consequently, on the one hand, the input torque is distributed in predetermined manner between the two face gears 4 and 5, and, on the other, the teeth of both pinion 8 and face gears 4 and 5 are subjected to a practically constant specific pressure pattern along the whole mesh line, so that, unlike known solutions involving a specific contact pressure peak substantially caused by the tilting torque on pinion 8, both gears 4 and 5 and pinion 8 are sized on the basis of a mean specific pressure value and are therefore decidedly cheaper, but above all far more lightweight and compact, as compared with corresponding known face gear transmissions. What is more, unlike known solutions, the substantially constant specific pressure along the whole mesh line of the teeth prevents localized wear.

Clearly, changes may be made to face gear transmission 1 as described herein without, however, departing from the scope of the present invention.

In particular, transmission 1 may comprise more than one input pinion 8 which need not necessarily be cylindrical; and teeth 4*a* and 5*a* may be of respective different widths B measured parallel to axis 13 of pinion 8.

What is claimed is:

1. A face gear transmission (1) for aircraft application comprising at least one floating pinion (8) rotating about a first axis (13); and two face gears (4) (5) rotating about a common second axis (3), positioned facing each other, and both meshing with said floating pinion (8); said first (13) and second (3) axis forming an angle (A) of other than 90°; characterized in that said two face gears (4) (5) have different diameters (D1) (D2); and in that the resultants of the forces exchanged between the faces gears (4) (5) and the floating pinion (8) are applied at respective points (P3) (P4), the projections (P1) (P2) of which on said first axis (13) are substantially coincident with each other.

2. A transmission as claimed in claim 1, characterized in that said projections (P1) (P2) of said points (P3) (P4) on said first axis (13) are perfectly coincident with each other.

3. A transmission as claimed in claim 1, characterized in that said two face gears (4) (5) comprise respective face teeth (4*a*) (5*a*) having respective first dimensions (B), measured parallel to said first axis (13), which are substantially equal.

4. A transmission as claimed in claim 3, characterized in that the teeth of said floating pinion (8) have a second dimension (C), measured parallel to said first axis (13), which is substantially equal to said first dimensions (B).

5. A transmission as claimed in claim 1, characterized in that said floating pinion (8) is an input pinion.

6. The transmission as claimed in claim 1, wherein the face gears are spaced with a spacing (s) measured as an axial component of a distance between the respective points (P3,P4) of resultant forces; and wherein angle (A) between the first (13) and second (3) axes is substantially equal to arctan (2s/(D2-D1)).

7. The transmission according to claim 1, wherein the different diameters are different outside diameters.

8. The transmission according to claim 1, wherein the different diameters are different mean diameters.

* * * * *